Dec. 29, 1931.  A. DE CLAIRMONT  1,838,215
AQUARIUM
Filed Nov. 6, 1929  3 Sheets-Sheet 1

Inventor
A. De Clairmont.
By Lacey & Lacey,
Attorneys.

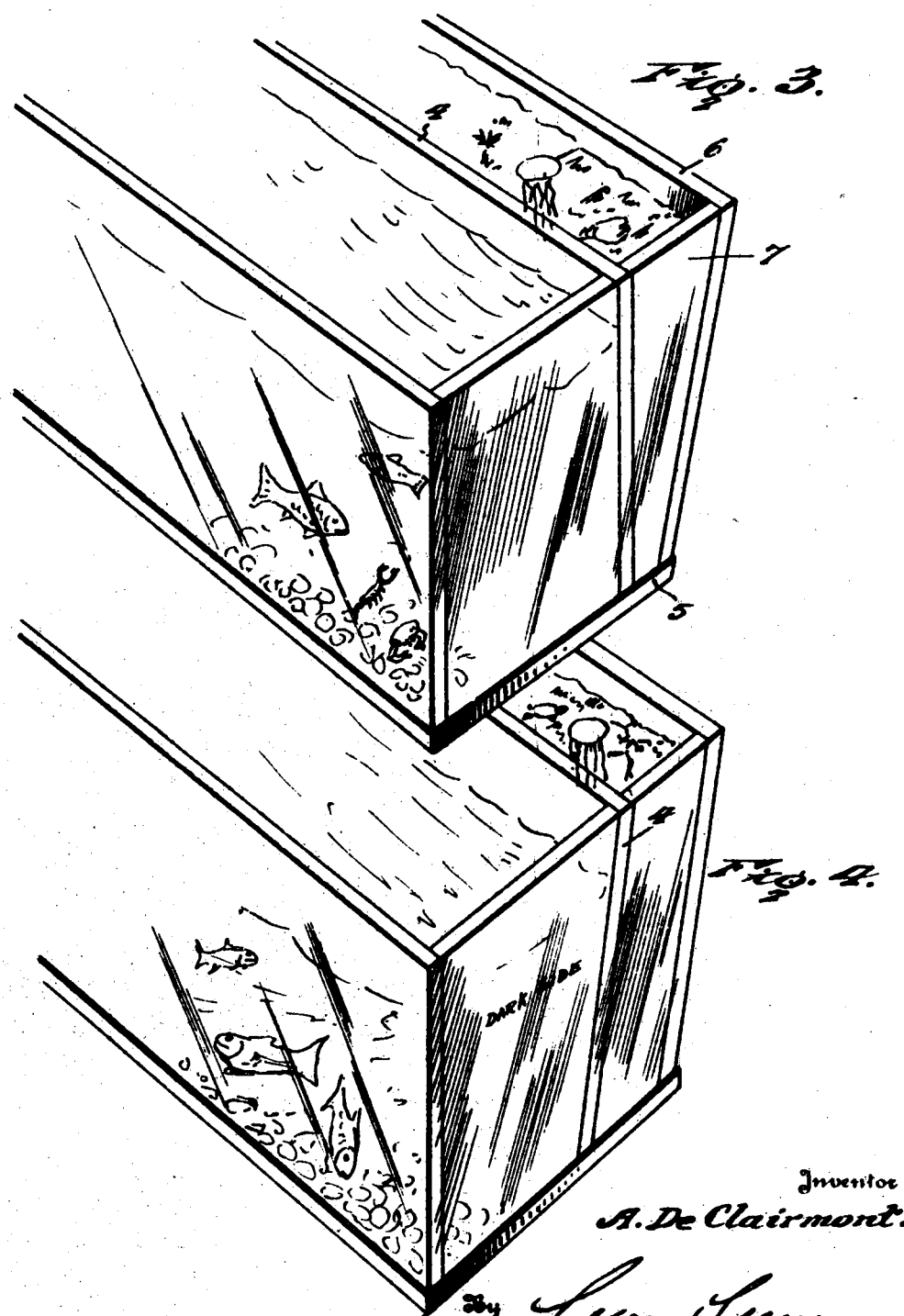

Dec. 29, 1931.  A. DE CLAIRMONT  1,838,215
AQUARIUM
Filed Nov. 6, 1929   3 Sheets-Sheet 3
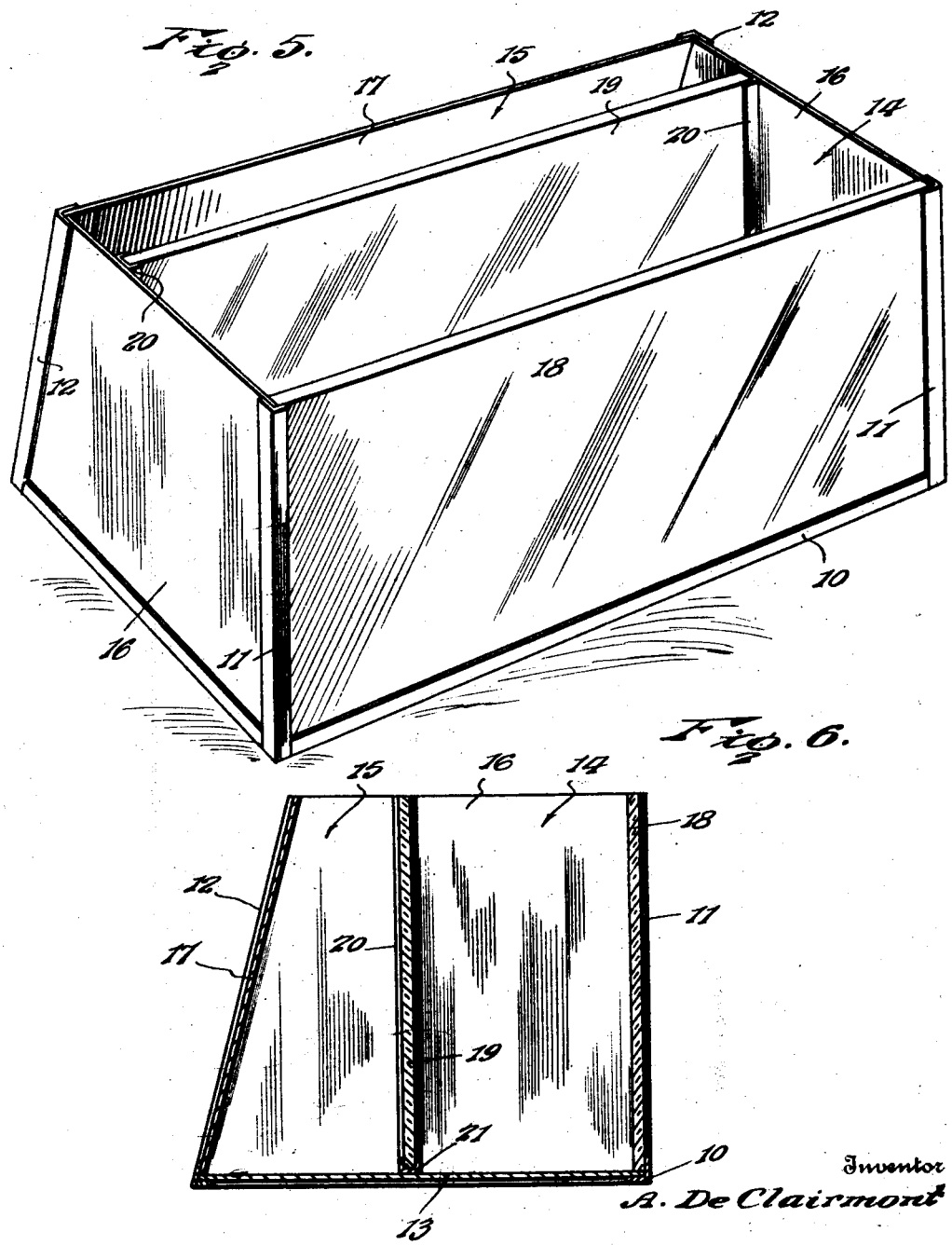

Patented Dec. 29, 1931

1,838,215

UNITED STATES PATENT OFFICE

ADOLPH DE CLAIRMONT, OF LOS ANGELES, CALIFORNIA

AQUARIUM

Application filed November 6, 1929. Serial No. 405,208.

This invention relates to aquariums and has as its primary aim to provide an aquarium so constructed that the value of the exhibit therein will be greatly enhanced, particularly as concerns its attractiveness and from an educational view point. In the ordinary aquariums consisting merely of a tank, it is impractical to exhibit any forms of sea life, except such as will remain alive in captivity. For example, in such a tank it is impossible to exhibit various forms of coral, various kinds of shell fish, sea anemones, polyps, medusæ, etc.; nor is it practical in the ordinary aquarium tank to for any length of time keep various forms of aquatic life, as they, like coral, accumulate slime and become discolored. The present invention, therefore, aims to provide an aquarium so constructed that there may be exhibited therein various types of aquatic life which cannot be exhibited in the ordinary aquarium tank so that, as stated, the exhibit will possess greater educational value and be more attractive than the ordinary exhibit.

The invention aims further to so construct the aquarium that the various forms of perishable aquatic life or models thereof to be exhibited will appear to be submerged although, as a matter of fact, they are not located in the water in which the live fish and the like are kept. Thus by following the principles of the present invention there may be exhibited various types of fishes in their natural element and may also be exhibited the other forms of aquatic life above mentioned so that the living fish and the like appear to be in surroundings such as would be likely to be found at the bottom of the sea.

Figure 1:
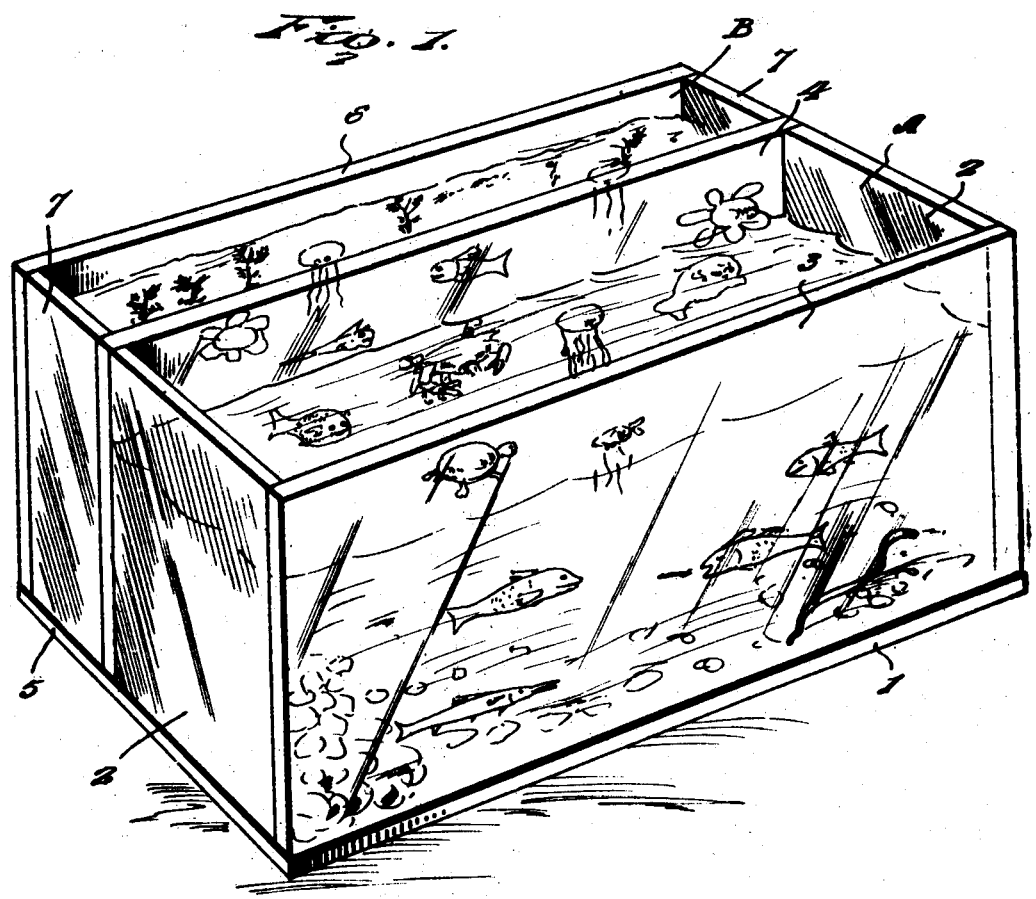
Figure 2:
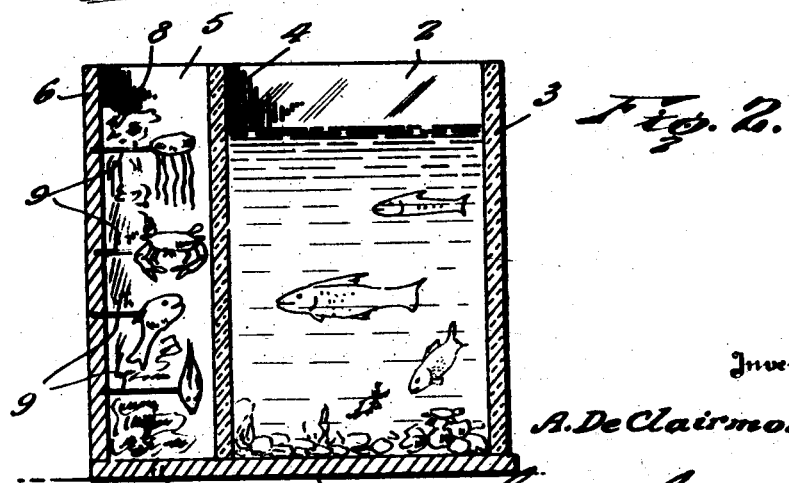

In the accompanying drawings:

Figure 1 is a perspective view of an aquarium constructed in accordance with the present invention, Fig. 2 is a vertical front to rear sectional view therethrough, Fig. 3 is a perspective view illustrating one end of a second form of aquarium, Fig. 4 is a similar view illustrating a third form of the invention, Fig. 5 is a perspective view of a fourth form of the invention, and Fig. 6 is a vertical sectional view through Fig. 5.

From an inspection of the drawings and from the specific description of the aquarium which is to follow, it will be evident that the same may be made in various sizes and shapes and that arrangements and effects other than those illustrated in the several figures of the drawings may be resorted to without departing from the principles of the invention. In the several figures of the drawings, the aquarium is illustrated as comprising a tank, indicated in general by the reference letter A, which is to be filled with water to maintain the living members of the exhibit and a case B which in the forms of the invention illustrated is arranged at the back of the tank A and which is to contain the portion of the exhibit which cannot be kept in water. The tank A comprises the usual base 1, ends 2, front 3 and back 4, and in the present instance the front 3 and back 4 are of glass or other transparent material whereas the ends 2 are opaque or translucent. As stated, in the tank A there are exhibited fishes and other living aquatic forms of life which can be kept alive for a considerable period of time in captivity. The case B comprises a base portion 5 which may be a continuation of the base 1 of the tank A or may be separate therefrom, a back 6 and ends 7, the case being open at its front and being so arranged that its open front will be next adjacent the back 4 of the tank A. The back or rear wall 6 of the case B may be transparent, translucent, or opaque, as found desirable. In any event, the case B is preferably open at its top as is also the tank A, so that the interior of the case will be illuminated by light entering through the top as well as by light entering through the front thereof or, in other words, passing through the transparent rear wall 4 of the tank. As in the case of the back 6, the ends 7 of the case may be transparent, translucent, or opaque, although it is preferable that they be opaque so as to permit of the interior of the case being viewed only through the water in the tank A. Painted or molded in any suitable manner upon the inner face of the back 6 of the case B, as indicated by the numeral 8, is an under water scene representing the appearance of the bottom of the sea and, if desired, one or more artificial grottoes, rocks or the like may be arranged within the said case B. Supported in any suitable manner within the said case are various forms of aquatic life which cannot be kept in water in captivity or models thereof may be employed if the forms they represent are of a perishable nature, and these elements of the exhibit may be supported, as, for example, by wires 9 which extend forwardly from the inner face of the back 6 of the case.

In that form of the invention shown in Figure 1 of the drawings, the back 6 of the case occupies a plane parallel to the rear wall 4 of the tank A, both being disposed in position perpendicular to the bottom of the aquarium. However, if desired, the wall 4 may be vertically disposed and the back wall 6 of the case B may be arranged in a plane upwardly inclined away from the said wall 4. In that form of the invention shown in Figure 4 of the drawings, the wall 6 is inclined as stated above, and the wall 4 is also inclined, the two walls occupying parallel planes.

From the foregoing description of the invention, it will be understood that when the interior of the aquarium is viewed through the front wall 3 of the tank A, the exhibit in the case B will be visible through the water in the said tank and will, in fact, appear to be submerged in the water and thus the fish and the like contained in the tank A will appear to move in their natural surroundings. Where the wall 6 of the case B is of transparent material or even of translucent material, a light passing therethrough will so illuminate the exhibit within the said case that transparent elements thereof, such, for example, as jelly-fish and the like, will be so illuminated as to give a clear idea as to their structure.

In Figures 5 and 6, there has been illustrated a fourth form of the improved aquarium. In this form of the invention, there is provided a frame 10 formed of angle metal and standards 11 and 12 projecting upwardly from the front and rear corners of the frame and also formed of angle metal. A sheet constituting a bottom for the tank 14 and case 15 rests upon the inwardly extending horizontal flanges of the frame, and in order to form end walls for the tank and case, there has been provided metal sheets 16 which rest upon ends of the metal sheet 13 and bear against the inwardly extending flanges of the standards or posts 11 and 12. The rear wall for the case consists of a metal sheet 17 which rests upon the rear edge of the bottom or sheet 13 and is confined between flanges of the post 12 and rear edges of the walls 16. It is to be understood that, if so desired, the walls 16 and 17 may be formed from a continuous sheet of metal bent to assume the proper shape. The front wall 18 for the tank which consists of a thick plate of clear glass fits between the posts or standards 11 and rests upon the forward end portion of the bottom 13, and in order to provide the tank with a rear wall 19, there is employed a plate of transparent glass which is set in place, as shown, with its ends engaged in tracks or standards 20 and its lower portion fitted into a seat 21 from the ends of which the standards 20 project. The seat 21 and standards 20 are preferably formed from a continuous strip of channel metal having its end portions bent upwardly, but it will be understood that separate strips of channel metal may be employed for this purpose. From an inspection of Figures 6, it will be seen that the wall 17 is disposed at such an incline that the distance between these walls increases toward the bottom of the case 15. Therefore, when marine objects or representations thereof are mounted in this case for observation through the wall of partition 19, an effect of increased distance will be imparted and a very attractive aquarium will be produced when water is poured into the tank 14 and fishes in the tank and the marine objects in the case are viewed through the front wall 18 of the tank and the partition.

Having thus described the invention, I claim:

1. In an aquarium, a tank having a bottom, end walls and transparent front and rear walls, and a case back of said tank separated therefrom by the rear wall of the tank. distance between the rear walls of the tank and case increasing towards the bottom of the case.

2. In an aquarium, a tank having a bottom, end walls and transparent front and rear walls, and a case back of said tank separated therefrom by the rear wall of the tank, said case having a rear wall disposed at an incline to impart increasing distance between the rear walls of the tank and case when contents of the tank and case are viewed through the transparent front wall of the tank.

3. In an aquarium, a tank having a bottom, end walls and transparent front and rear walls, and a case back of said tank separated therefrom by the rear wall of the tank, said case having a rear wall disposed at an incline and sloping rearwardly towards its lower end whereby distance between the rear walls of the tank and the case increases towards the bottom of the case.

4. In an aquarium, a frame of angle metal, posts of angle metal extending upwardly from front and rear corners of said frame, a bottom supported upon inwardly extending flanges of said frame, end walls in said frame engaged by the front and rear posts, a rear wall rising from said bottom between said end walls and engaged by the rear posts, a transparent front wall resting upon said bottom and engaging the end walls and front posts, a U-shaped yoke of channel metal resting upon said bottom with its arms extending upwardly against the end walls, and a transparent partition extending between the end walls with its ends and lower edge portion engaged by the yoke and defining a front tank and rear case.

In testimony whereof I affix my signature.

ADOLPH de CLAIRMONT, M. D. [L. S.]